US010404809B2

(12) United States Patent
Manolache et al.

(10) Patent No.: US 10,404,809 B2
(45) Date of Patent: Sep. 3, 2019

(54) SYSTEMS AND METHODS FOR ADAPTIVE ASSOCIATIVE ROUTING FOR MOBILE MESSAGING

(71) Applicant: Google Inc., Mountain View, CA (US)

(72) Inventors: Doru Costin Manolache, Mountain View, CA (US); Subir Jhanb, Cupertino, CA (US); Tal Dayan, Los Gatos, CA (US); Francesco Nerieri, Santa Cruz, CA (US)

(73) Assignee: Google LLC, Mountain View, CA (US)

( * ) Notice: Subject to any disclaimer, the term of this patent is extended or adjusted under 35 U.S.C. 154(b) by 895 days.

(21) Appl. No.: 14/601,046

(22) Filed: Jan. 20, 2015

(65) Prior Publication Data

US 2016/0065532 A1  Mar. 3, 2016

Related U.S. Application Data

(60) Provisional application No. 62/044,162, filed on Aug. 29, 2014.

(51) Int. Cl.
*G06F 15/16* (2006.01)
*H04L 29/08* (2006.01)
*H04L 12/58* (2006.01)

(52) U.S. Cl.
CPC ............ *H04L 67/147* (2013.01); *H04L 51/14* (2013.01); *H04L 67/327* (2013.01)

(58) Field of Classification Search
CPC ...... H04L 51/14; H04L 67/147; H04L 67/327
See application file for complete search history.

(56) References Cited

U.S. PATENT DOCUMENTS

| 5,956,521 | A | * | 9/1999 | Wang | ...................... H04L 51/30 710/3 |
| 6,643,685 | B1 | * | 11/2003 | Millard | ............. H04L 29/12009 709/206 |
| 6,697,354 | B1 | * | 2/2004 | Borella | ............. H04L 29/12009 370/352 |
| 7,609,668 | B1 | * | 10/2009 | Smith | ..................... H04L 12/18 370/328 |
| 2003/0065252 | A1 | * | 4/2003 | Zoth | ...................... A61B 5/121 600/300 |

(Continued)

*Primary Examiner* — Tonia L Dollinger
*Assistant Examiner* — Dixon F Dabipi
(74) *Attorney, Agent, or Firm* — Colby Nipper PLLC

(57) ABSTRACT

In an example implementation of the disclosed technology, a method includes assigning a computing device to a region associated with a region server that comprises a plurality of region server instances. The method also includes generating device-to-region mapping and transmitting a replica of the device-to-region mapping to a messaging server instance and connection server instance. Further, the method includes receiving local device connection information comprising connection information relating the computing device and the connection server instance. The method also includes outputting the local device connection information to the plurality of region server instances. Additionally, the method includes receiving a message for delivery to the computing device and, responsive to accessing the local device connection information, transmitting the message to the connection server instance identified by the local device connection information.

18 Claims, 4 Drawing Sheets

(56) References Cited

U.S. PATENT DOCUMENTS

| | | | |
|---|---|---|---|
| 2007/0281694 A1* | 12/2007 | Lin | H04W 48/18 |
| | | | 455/435.2 |
| 2008/0071925 A1* | 3/2008 | Leighton | H04L 29/12066 |
| | | | 709/241 |
| 2009/0005035 A1* | 1/2009 | Hu | H04W 8/12 |
| | | | 455/433 |
| 2010/0318680 A1* | 12/2010 | Daniel | G01C 21/32 |
| | | | 709/245 |
| 2011/0081906 A1* | 4/2011 | Jiang | H04W 8/26 |
| | | | 455/433 |
| 2011/0213634 A1* | 9/2011 | Karakey | G06Q 10/063112 |
| | | | 705/7.14 |
| 2012/0023153 A1* | 1/2012 | Karasaridis | H04L 61/1511 |
| | | | 709/203 |
| 2013/0339519 A1* | 12/2013 | Lientz | H04L 41/0896 |
| | | | 709/224 |
| 2014/0031035 A1* | 1/2014 | Tagg | H04W 8/04 |
| | | | 455/433 |
| 2014/0280996 A1* | 9/2014 | Harrang | H04L 63/10 |
| | | | 709/229 |
| 2015/0019294 A1* | 1/2015 | Milton | G06Q 30/0205 |
| | | | 705/7.34 |
| 2015/0032905 A1* | 1/2015 | Celebi | H04L 61/2015 |
| | | | 709/245 |
| 2015/0098554 A1* | 4/2015 | Winterbottom | H04W 4/22 |
| | | | 379/45 |
| 2015/0163260 A1* | 6/2015 | Dayan | H04L 51/066 |
| | | | 709/206 |
| 2015/0302305 A1* | 10/2015 | Rupp | A01B 79/005 |
| | | | 706/46 |

* cited by examiner

US 10,404,809 B2

SYSTEMS AND METHODS FOR ADAPTIVE ASSOCIATIVE ROUTING FOR MOBILE MESSAGING

CROSS-REFERENCE TO RELATED APPLICATIONS

This application claims priority and the benefit under 35 U.S.C. § 119(e) of U.S. Provisional Patent Application No. 62/044,162, which was filed on Aug. 29, 2014; the entire contents and substance of which are hereby incorporated by reference.

BACKGROUND

To receive messages from other computing devices, a computing device establishes a connection to one of many connection servers. After establishing a connection to a connection server, any message intended for that computing device must be routed through the connection server to which the computing device is connected. Accordingly, the connection server propagates this device-to-connection server mapping data globally such that, upon receipt of a message intended for the device, messaging servers can determine the appropriate connection server to send the message. When the computing device loses its connection to the connection server, it must reestablish its connection or connect to a different connection server. After reestablishing a connection or establishing a new connection, there is a blackout period during which the device-to-connection server mapping data is globally propagated, which causes a blackout period during which the device is incapable of receiving messages.

SUMMARY

Some or all of the above needs may be addressed by certain implementations of the disclosed technology. According to an example implementation, a method is provided. The method may include assigning a computing device to a region associated with a region server comprising a plurality of region server instances, generating device-to-region mapping, and transmitting a replica of the device-to-region mapping to a messaging server instance and a connection server instance. Further, the method may include receiving local device connection information comprising connection information relating the computing device and the connection server instance and outputting the local device connection information to the plurality of region server instances. The method may also include receiving a message for delivery to the computing device, wherein the message is received from the messaging server instance and, responsive to accessing the local device connection information, transmitting the message to the connection server instance identified by the local device connection information.

According to an example implementation, a system is provided. The system may include one or more processors and a memory coupled to the one or more processors and storing instructions that, when executed by the one or more processors, cause the system to: assign a computing device to a region, wherein the region is associated with a region server comprising a plurality of region server instances; generate device-to-region mapping; transmit a replica of the device-to-region mapping to a messaging server instance and a connection server instance; receive local device connection information, wherein the local device connection information comprises connection information relating the computing device and the connection server instance; output the local device connection information to the plurality of region server instances; receive a message for delivery to the computing device, wherein the message is received from the messaging server instance; and, responsive to accessing the local device connection information, transmitting the message to the connection server instance identified by the local device connection information.

According to an example implementation, a computer-readable medium is provided. The computer-readable medium may store instructions that, when executed by one or more processors, cause a first computing device to: assign a second computing device to a region, wherein the region is associated with a region server comprising a plurality of region server instances; generate device-to-region mapping; transmit a replica of the device-to-region mapping to a messaging server instance and a connection server instance; receive local device connection information, wherein the local device connection information comprises connection information relating the second computing device and the connection server instance; output the local device connection information to the plurality of region server instances; receive a message for delivery to the second computing device, wherein the message is received from the messaging server instance; and responsive to accessing the local device connection information, transmitting the message to the connection server instance identified by the local device connection information.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
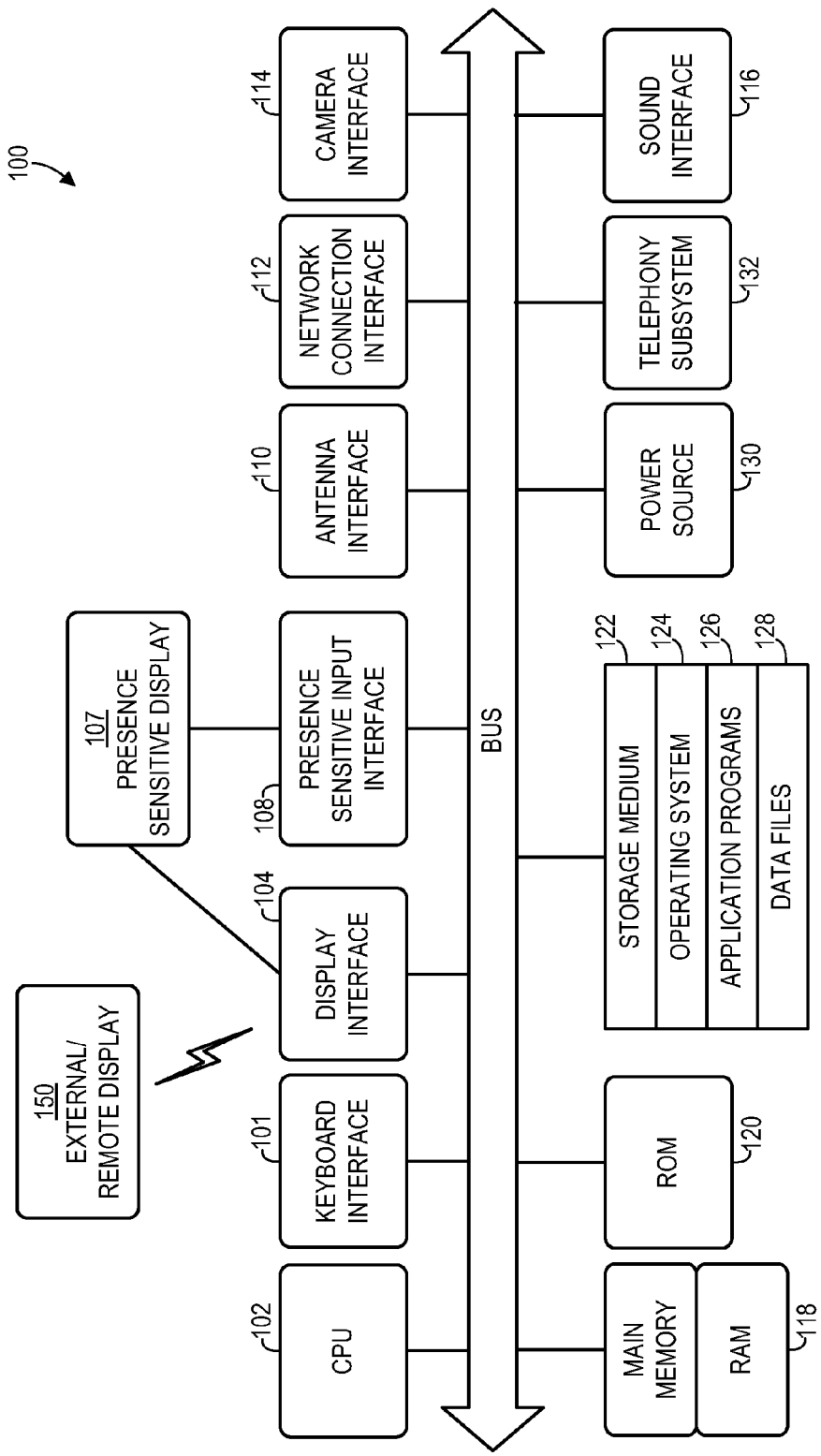
FIG. 1 is a block diagram of an illustrative computer system architecture 100, according to an example implementation.

In some implementations of the disclosed technology, a regional assignment module may assign a computing device to a specific geographic region that is associated with a region server cell. Likewise, the regional assignment module may record the device-to-region mapping, which details the assignment of the computing device, as identified by a device ID, to the region i.e., the currently assigned region). This device-to-region mapping may then be replicated to associated messaging server cells and connection server cells. In some implementations, when a computing device connects to a connection server cell, the connection server may create local device connection information (i.e., device-to-connection server information) to detail the connection of the device to the connection server cell. Further, in some implementations, the connection server cell may check its local copy of device-to-region mapping to determine computing device's currently assigned region, and, upon determining the appropriate device-to-region assignment, the connection server may transmit local device connection information to the region server cell associated with the currently assigned region.

Accordingly, in one implementation, when a messaging server cell receives a message for delivery to the computing device, the messaging server cell can check its local copy of device-to-region mapping to determine the region to which the computing device is assigned (i.e., the currently assigned region). Upon determining the currently assigned region, the messaging server cell may forward the message to the region server cell associated with the currently assigned region. When the region server cell receives the message, it may perform a local lookup of device-to-connection server information to determine the connection server cell to which the device is connected. Accordingly, in one implementation, the region server cell may transmit the message to the appropriate connection server cell such that the message can be delivered to the intended computing device.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Example implementations of the disclosed technology will now be described with reference to the accompanying figures.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that acts as a communication interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. In one example, the display interface 104 may be operatively coupled to a local display, such as a touch-screen display associated with a mobile device. In another example, the display interface 104 may be configured to provide video, graphics, images, text, other information, or any combination thereof for an external/remote display that is not necessarily connected to the mobile computing device. In one example, a desktop monitor may be utilized for mirroring or extending graphical information that may be presented on a mobile device. In another example, the display interface 104 may wirelessly communicate, for example, via the network connection interface 112 such as a Wi-Fi transceiver to the external/remote display.

The computing device architecture 100 may include a keyboard interface 106 that provides a communication interface to a keyboard. In one example implementation, the computing device architecture 100 may include a presence-sensitive display interface 108 for connecting to a presence-sensitive display 107. According to certain example implementations of the disclosed technology, the presence-sensitive display interface 108 may provide a communication interface to various devices such as a pointing device, a touch screen, a depth camera, etc. which may or may not be associated with a display.

The computing device architecture 100 may be configured to use an input device via one or more of input/output interfaces (for example, the keyboard interface 106, the display interface 104, the presence sensitive display interface 108, network connection interface 112, camera interface 114, sound interface 116, etc.,) to allow a user to capture information into the computing device architecture 100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device architecture 100 or may be a separate device. For example, the input device may be an accelerometer, a magnetometer, a digital camera, a microphone, and an optical sensor.

Example implementations of the computing device architecture 100 may include an antenna interface 110 that provides a communication interface to an antenna; a network connection interface 112 that provides a communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 124, application programs 126 (including, for example, a web browser application, a widget or gadget engine, and or other applications, as necessary) and data files 128 are stored. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive sound over a telephone network. The constituent devices and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system application programs, and device drivers.

More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may comprise a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example implementation, the computing device may output content to its local display and/or speaker (s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
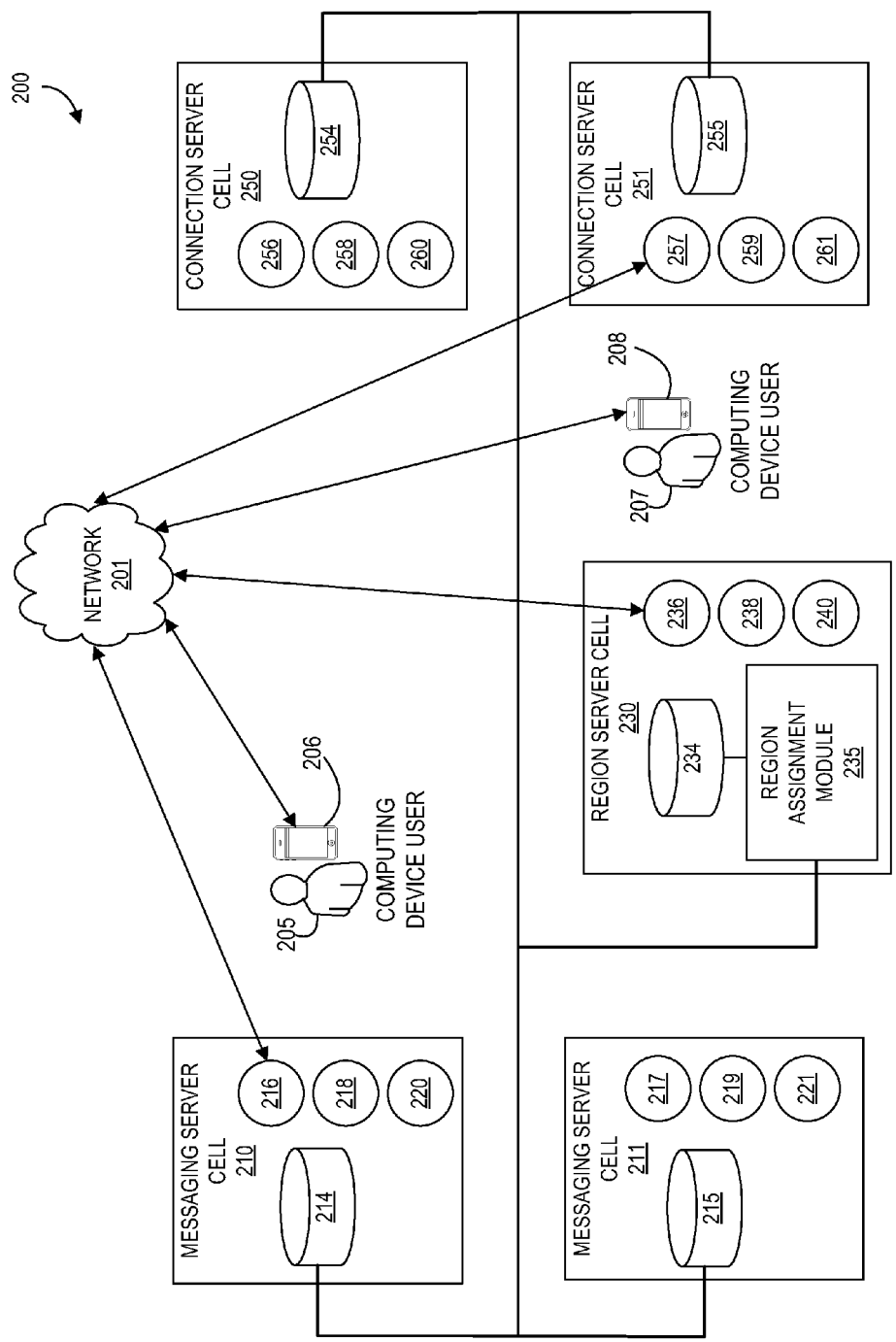
FIG. 2 is an overview of an environment 200 illustrating components that may be included in an adaptive associative routing system for mobile messaging, according to an example implementation.

FIG. 2 illustrates an overview of an implementation of components that may be included in and/or utilize an adaptive associative routing system for mobile messaging in an exemplary environment 200. According to one implementation, messaging server cells 210 and 211, a region server cell 230, connection server cells 250 and 251 may be operatively connected through a network 201, such as the Internet. Though not shown, it will be understood by one of skill in the art that network transmissions and communications are not necessarily direct and may involve various routers and other hardware. Further, mobile users 205 and 207 may use computing devices 206 and 207 (e.g., a mobile phone, laptop computer, tablet computer, or other computing device), respectively, which may be operatively connected to one or more messaging server cells 210, 211, and one or more connection server cells 250, 251 through a network 201. As will be understood by one of skill in the art, messaging server cells 210 and 211, region server cell 230, connection server cells 250 and 251, and computing devices 206 and 207 may include some or all of the components of the computing device 100 shown in FIG. 1.

In one implementation, a messaging server cell 210, 211 (alternatively, a messaging server) may be configured to receive mobile messages (e.g., email messages, text messages, Google Hangout messages, "tweets," Facebook messages, and various other mobile messages as will be familiar to one of skill in the art) sent from a computing device (e.g., 206) and intended for another computing device (e.g., 208). Further, in one implementation, a connection server cell 250, 251 (alternatively, a connection server) may be configured to establish connections with mobile devices (e.g., 206, 208) and deliver messages intended for those mobile devices. Also, in one implementation, a region server cell 230 (alternatively, a region server) may be configured to receive messages from a messaging server cell 210, 211 and to forward those messages to a connection server cell 250, 251.

According to one implementation, server cells (e.g., messaging server cell 210, region server cell 230, connection server cell 250) may comprise a database and a plurality of server instances. For example, as shown in FIG. 2, messaging server cell 210 may comprise a database 214 and server instances 216, 218, and 220. As shown in FIG. 2, messaging server cell 211 may be similarly configured as it may comprise a database 215 and messaging server instances 217, 219, and 221. As further shown in FIG. 2, in one implementation, a connection server cell 250, 251 may comprise a database (254, 255 respectively) and connection server instances (256, 258, 260 and 257, 259, 261, respectively). Similarly, a region server cell 230 may comprise a database 234 and region server instances 236, 238, and 240.

As will be understood, an environment 200 for utilizing an adaptive associative routing system for mobile messaging may comprise more or less components than shown in FIG. 2. For example, in certain implementations, the environment 200 may comprise twenty messaging server cells (e.g., 210, 211), each of which may comprise thousands of messaging server instances (e.g., 216, 217). Likewise, in certain implementations, the environment 200 may comprise ten region server cells (e.g., 230), each of which may comprise hundreds of messaging server instances (e.g., 236, 238). Further, in certain implementations, the environment 200 may comprise twenty connection server cells (e.g., 250, 251), each of which may comprise thousands of connection server instances (e.g., 256, 257). In various implementations, the messaging server cells (e.g., 210, 211), region server cells (e.g., 230), and connection server cells (250, 251) may be distributed across the globe. As will be understood and appreciated, such a distributed configuration of messaging server cells, region server cells, and connection server cells may allow billions of computing devices (e.g., 206, 208) to send and receive messages.

As shown in FIG. 2, an environment 200 for utilizing an adaptive associative routing system for mobile messaging may comprise a region assignment module 235, which may include some or all of the components of the computing device 100 shown in FIG. 1. In one implementation, a region assignment module 235 may be included in a region server cell 200. Likewise, a region assignment module 235 may be implemented as a stand-alone component. In an example implementation, a region assignment module 235 may assign a computing device (e.g. 206, 208) to a particular region, which is generally associated with a particular region server cell (e.g., 230). So, for example, in one implementation, region assignment module 235 may assign computing device 208 to the region associated with region server cell 230, which results in a device-to-region mapping. In such an example, the region server cell 230, and the various region server instances (e.g., 236, 238, 240) may maintain copies of this device-to-region mapping. Further, in such an example, the region assignment module 230 may replicate the device-to-region mapping such that the device-to-region mapping can be provided to the various messaging server cells (e.g., 210, 211), messaging server instances (e.g., 216, 218), connection server cells (e.g., 250, 251), and connection server instances (e.g., 256, 258). As will be understood and appreciated, pre-assigning a computing device to a particular region (and an associated region server cell) and providing the associated device-to-region mapping to the various messaging server cells and connection server cells (and their associated server instances) negates the necessity to globally replicating device connection information each and every time a device establishes a connection with a connection server cell (or connection server instance), thus preventing blackout periods that occur while the device connection information is propagated.

Figure 3:
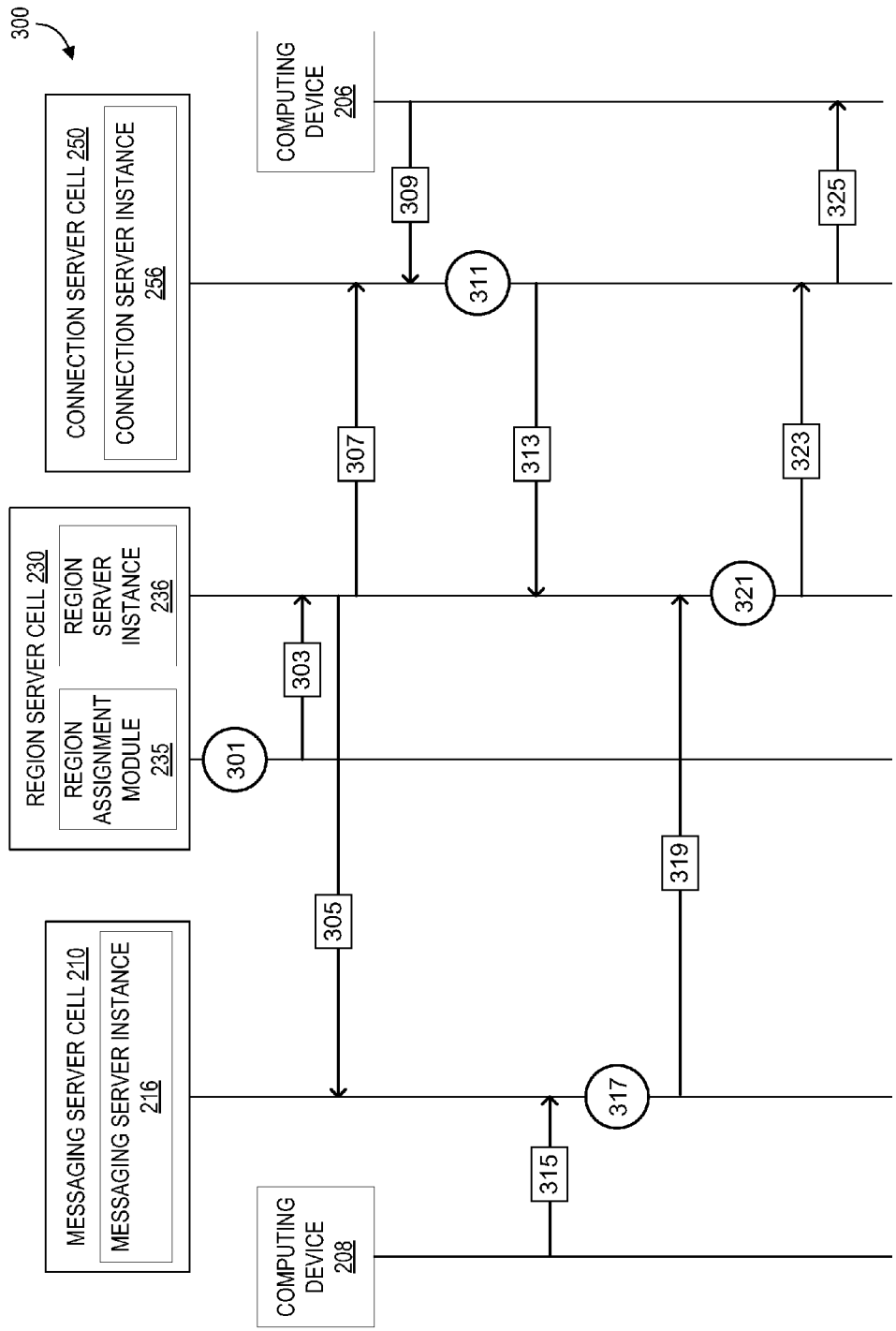
FIG. 3 is a sequence diagram illustrating an exemplary message routing process 300, according to an example implementation.

FIG. 3 is a sequence diagram illustrating an exemplary message routing process 300, according to an example implementation. As discussed, in certain implementations, a region assignment module 235 may assign a computing device to a particular region, which is generally associated with a particular region server cell. For example, as shown in FIG. 3, a region assignment module 235 may assign a computing device 206 to the region associated with region server cell 230, at 301. Accordingly, in one implementation, the assignment may yield device-to-region mapping associated with the computing device 206, which may be received and maintained by a messaging server instance 236 associated with the region server cell 230, at 303. Further, in one implementation, the messaging server instance 236 may replicate the device-to-region mapping and transmit the mapping to the messaging server instance 216 of messaging server cell 210, at 305, and the connection server instance 256 of connection server cell 250, at 307. As discussed, pre-assigning a device to a particular region and providing this device-to-region mapping to the messaging server cells (e.g., 210) and connection server cells (e.g., 250) negates the necessity to globally propagate local device connection information every time the computing device 206 establishes a connection to a connection server cell 250 or connection server instance 256.

In one implementation and as shown in FIG. 3, at 309, the connection server instance 256 may establish a connection with the computing device 206, thus creating local device connection information (alternatively referred to as "device-to-connection-server information"). Accordingly, at 311, the connection server instance 256 may look up the device-to-region mapping associated with the computing device 206 to determine the region to which the computing device 206 is assigned, according to one implementation. Additionally, upon determining the region to which the computing device 206 is assigned, the connection server instance 256 may forward the local device connection information to an arbitrary region server instance (e.g., the region server instance 236), at 313. In an example implementation, the local device connection information received by the region server instance 236 may be propagated to the other region server instances (e.g., 238, 240) comprised in the region server cell 230 associated with the region to which the computing device 206 is assigned.

As further shown in FIG. 3, in an example implementation, a messaging server instance 216 may receive a message from a computing device 208 intended for computing device 206, at 315. In one implementation, at 317, the messaging server instance 216 may utilize the device-to-region mapping received at 305 to determine the region to which computing device 206 (i.e., the computing device to which the message is intended) is assigned. In one implementation, after determining the proper region assignment, the messaging server instance 216 may forward the message to an arbitrary region server instance in the region server cell associated with the region. For example, as shown in FIG. 3, at 319, the messaging server instance 216 may forward the message to region server instance 236. When the region server instance 236 receives the message, the region server instance may utilize local device connection information to determine the connection server cell (e.g., 250) or connection server instance (e.g., 256) to which the intended computing device 206 is currently connected, at 321, according to one implementation and as shown in FIG. 3. After determining the appropriate connection server instance (i.e., 256), in one implementation the region server instance 236 may transmit (i.e., route) the message to the connection server instance, at 323, which the region server instance 256 can then deliver to the computing device 206, et 325.

Generally, it is advantageous to have close geographic proximity between the connection server instance 256 to which the computing device 206 connects and the region (and associated region server cell 230) to which the computing device 206 is assigned. As will be understood and appreciated, close geographic proximity between the region server cell 230 and connection server cell 250 generally reduces the network distance of routing a message from the messaging server instance (e.g., 216) to the appropriate connection server instance (e.g., 256). In one implementation, a region assignment module 235 may analyze historical device-to-connection-server information (e.g., IP address information), and, based on the general geographic locality of device connections, the region assignment module 235 may predict which region (and associated region server cell (e.g., 230)) will provide the best proximity to the connection server instance (e.g., 256) to which the computing device 206 is most likely to connect. Further, in example implementations, a region assignment module 235 may also utilize load balancing information before assigning a computing device 206 to a region.

The foregoing describes a scenario in which a messaging server instance 216 receives and subsequently transmits a message that is ultimately routed to a connection server instance 256 for delivery to the intended computing device 208. It will be understood by one of ordinary skill in the art that in an example embodiment, a server cell (e.g., connection server cell 250) or server instance (e.g., connection server instance 256) may be configured to be send and receive messages. Accordingly, in one configuration, a computing device connected to a connection server instance 261 may receive and transmit a message intended for a computing device connected to a connection server instance 257 or 258. Likewise, in one configuration, a computing device connected to a messaging server instance 220 may receive and transmit a message intended for a computing device connected to a messaging server instance 218 or 219.

In various implementations, the region assignment module 235 may be configured to perform an assignment at defined intervals (e.g., once per day, hourly, upon certain events, or other intervals). In such implementations, the resultant device-to-region mapping information can be replicated to other messaging server cells (210, 211) and connection server cells (250, 251) according to the consistent defined intervals. As will be understood and appreciated, consistently updating the device-to-region mapping information at consistent, predetermined intervals helps to eliminate blackout periods that occur when a device establishes a connection to a connection server instance. Because the messaging server instances know the region to which the computing device 206 is assigned, there is no need to globally propagate local device connection information to all region server cells and messaging server cells. Instead, propagation of local device connection information can be limited to the specific region server cell (e.g., 230) associated with the region to which the computing device 206 is assigned.

In one implementation, a region assignment module 235 may be configured to provide device-to-region mapping information that includes region assignment information for a computing device 206 both before and after a predetermined time. For example, in one implementation, a region assignment module 235 may provide device-to-region information that specifies that the device 206 will be assigned to a first region before time T1 and to a second region after time T1. Essentially, in one implementation, a region assignment module 235 may make both current and future region assignments. Accordingly, because all messaging server cells (e.g., 210, 211), messaging server instances (e.g., 216, 217, 218), connection server cells (e.g., 250, 251), and connection server instances (256, 257, 258) have knowledge of the time at which the computing device 206 is to be reassigned, there is a seamless and near simultaneous transition period and essentially no risk for blackout periods.

Aspects of the present disclosure may also be helpful in making near-instantaneous determinations as to whether a particular computing device 206 is currently connected to a connection server instance (e.g., 256). Put differently, aspects of the present disclosure may provide computing device connection information in response to requests (i.e., connectivity queries) as to whether a particular computing device is currently connected to a connection server instance. For example, a region server instance 236 may provide local device connection information in response to a connectivity query. Such information may be helpful in determining status information regarding a computing device 206 that may be helpful or interesting to other computing device users looking to communicate with the user of computing device 206.

Figure 4:
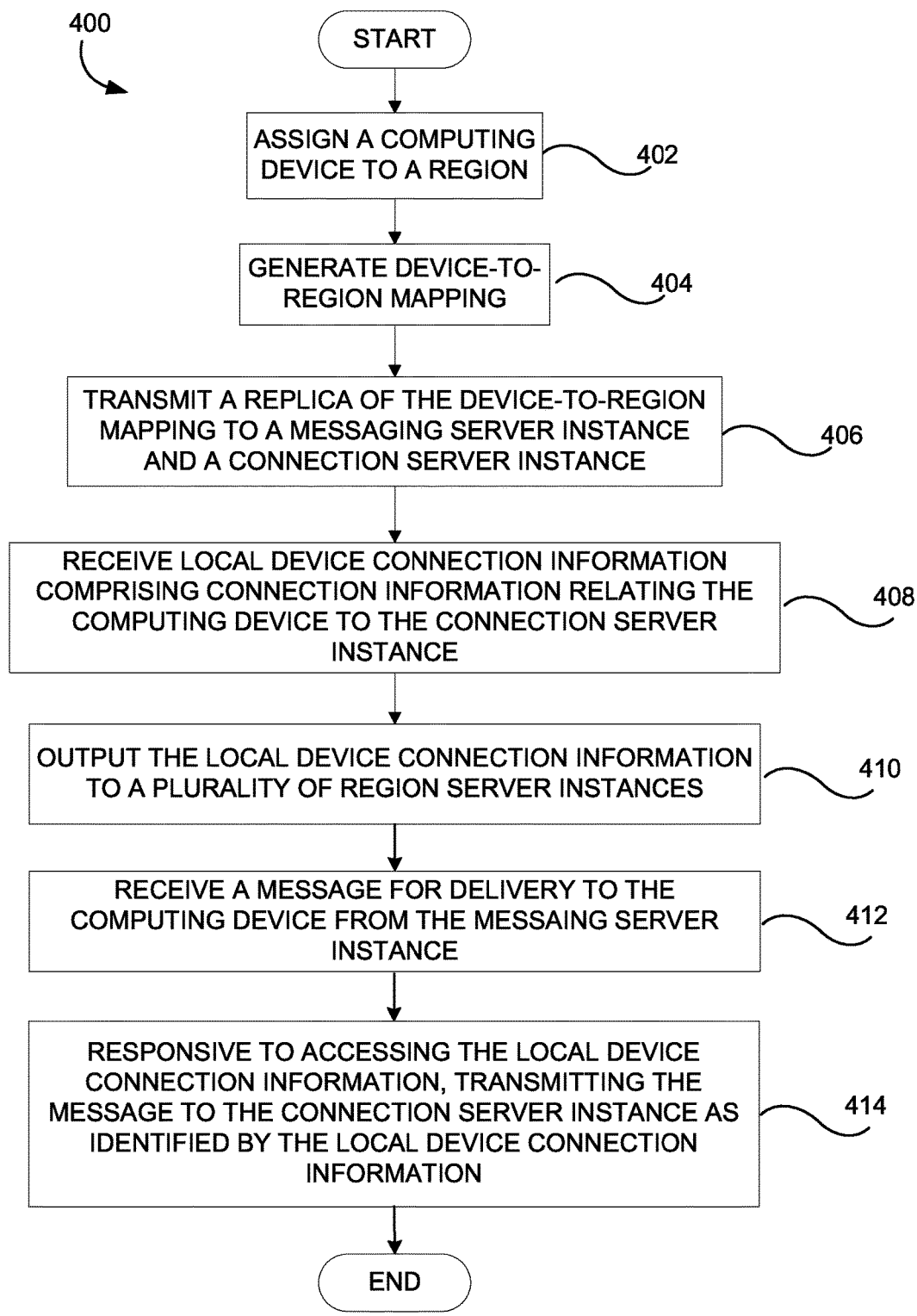
FIG. 4 is a flow diagram of a method 400 according to an example implementation.

FIG. 4 is a flow diagram of a method 400 according to an example implementation of the disclosed technology. The method 400 begins at block 402, where a computing device is as assigned to a region that is associated with a region server that comprises a plurality of region server instances. In one implementation, a region assignment module may be configured to assign computing devices to regions. According to one implementation, at 404, device-to-region mapping may be generated to reflect the assignment of the computing device to the region. In certain implementations, a region assignment module may be configured to generate device-to-region mapping. At 406, a replica of the device-to-region mapping may be transmitted to a messaging server instance and a connection server instance, according to one implementation. As will be understood and appreciated, the device-to-region mapping may be transmitted to additional messaging server instances and connection server instances.

In one implementation, at 408, local device connection information may be received that relates the computing device to a connection server instance. In one implementation, the local device connection information may be received by an arbitrary region server instance. At 410, according to one implementation, the arbitrary region server instance may transmit the local device connection information to the other region server instances in the region server. Further, at 412, an arbitrary region server instance may receive a message for delivery to the computing device, according to one implementation. For example, the message may be received from a messaging server instance. At 414, in one implementation, the region server instance may transmit the message to the appropriate connection server instance responsive to accessing local device connection information to determine which connection server instance the computing device is currently connected.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

Implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person of ordinary skill to practice certain implementations of the disclosed technology, including making and using any devices or systems and performing any incorporated methods. The patentable scope of certain implementations of the disclosed technology is defined in the claims, and may include other examples that occur to those of ordinary skill Such other examples are intended to be within the scope of the claims if they have structural elements that do not differ from the literal language of the claims, or if they include equivalent structural elements with insubstantial differences from the literal language of the claims.

What is claimed is:

1. A method performed by a region server, the method comprising:
    during an initial defined interval, pre-assigning a first computing device to a region associated with the region server;
    generating a device-to-region mapping detailing the pre-assignment of the first computing device to the region;
    transmitting a replica of the device-to-region mapping to a messaging server instance and a connection server instance;
    responsive to transmitting the replica of the device-to-region mapping to the connection server instance, receiving, from the connection server instance, local device connection information created by the connection server instance detailing a connection between the first computing device and the connection server instance;
    responsive to transmitting the replica of the device-to-region mapping to the message server instance, receiving, from the message server instance, messages from one or more second computing devices for delivery to the first computing device during the initial defined interval;

utilizing the device-to-region mapping to determine the region pre-assigned to the first computing device;

forwarding the messages to at least one region server instance associated with the region pre-assigned to the first computing device in the device-to-region mapping;

utilizing the local device connection information received previously from the connection server instance to determine the connection server instance to which the first computing device shares the connection thereby preventing blackout periods during the initial defined interval, the blackout periods prohibit propagation of device connection information; and responsive to determining the connection server instance to which the first computing device shares the connection, transmitting the messages to the determined connection server instance for transmission to the first computing device over the connection and during the initial defined interval.

2. The method of claim 1, further comprising:

analyzing historical device-to-connection-server information to select the region from a plurality of regions before pre-assigning the computing device to the region.

3. The method of claim 2, wherein the historical device-to-connection-server information comprises IP address information.

4. The method of claim 1, further comprising:

responsive to receiving a connectivity query, providing the local device connection information.

5. A non-transitory computer-readable medium storing instructions that, when executed by one or more processors, cause a region server to:

during an initial defined interval, pre-assign a first computing device to a region associated with the region server;

generate a device-to-region mapping detailing the pre-assignment of the first computing device to the region;

transmit a replica of the device-to-region mapping to a messaging server instance and a connection server instance;

responsive to transmitting the replica of the device-to-region mapping to the connection server instance, receive, from the connection server instance, local device connection information created by the connection server instance detailing a connection between the first computing device and the connection server instance;

responsive to transmitting the replica of the device-to-region mapping to the message server instance, receive, from the message server instance, messages from one or more second computing devices for delivery to the first computing device during the initial defined interval;

utilize the device-to-region mapping to determine the region pre-assigned to the first computing device in the device-to-region mapping;

forward the messages to at least one region server instance associated with the region pre-assigned to the first computing device in the device-to-region mapping;

utilize the local device connection information received previously from the connection server instance to determine the connection server instance to which the first computing device shares the connection thereby preventing blackout periods during the initial defined interval, the blackout periods prohibit propagation of device connection information; and responsive to determining the connection server instance to which the first computing device is currently connected, transmit the messages to the determined connection server instance for transmission to the first computing device over the connection and during the initial defined interval.

6. The computer-readable medium of claim 5, wherein the instructions, when executed, cause the region server to pre-assign the first computing device to the region responsive by analyzing historical device-to-connection-server information to select the region from a plurality of regions.

7. The computer-readable medium of claim 6, wherein the historical device-to-connection-server information comprises IP address information.

8. The computer-readable medium of claim 5, further storing instructions that, when executed by one or more processors, further cause the region server to:

responsive to receiving a connectivity query, provide the local device connection information.

9. A system comprising:

one or more processors; and a memory coupled to the one or more processors and storing instructions that, when executed by the one or more processors, cause the system to:

during an initial defined interval, pre-assign a first computing device to a region associated with the system;

generate a device-to-region mapping detailing the pre-assignment of the first computing device to the region;

transmit a replica of the device-to-region mapping to a messaging server instance and a connection server instance;

responsive to transmitting the replica of the device-to-region mapping to the connection server instance, receive, from the connection server instance, local device connection information created by the connection server instance detailing a connection between the first computing device and the connection server instance;

responsive to transmitting the replica of the device-to-region mapping to the message server instance, receiving, from the message server instance, messages from one or more second computing devices for delivery to the first computing device during the initial defined interval;

utilizing the device-to-region mapping to determine the region pre-assigned to the first computing device in the device-to-region mapping;

forward the messages to at least one region server instance associated with the region pre-assigned to the first computing device in the device-to-region mapping;

utilize the local device connection information received previously from the connection server instance to determine the connection server instance to which the computing device shares the connection thereby preventing blackout periods during the initial defined interval, the blackout periods prohibit propagation of device connection information; and responsive to determining the connection server instance to which the first computing device is currently connected, transmit the messages to the determined connection server instance for transmission to the first computing device over the connection and during the initial defined interval.

10. The system of claim 9,
further storing instructions that, when executed by the one or more processors, further cause the system to analyze historical device-to-connection-server information prior to assigning the computing device to the region instead of a different region.

11. The system of claim 9, further storing instructions that, when executed by one or more processors, further cause the system to:
responsive to receiving a connectivity query, provide the local device connection information.

12. The method of claim 1, wherein the local device connection information is created by the connection server instance in response to establishing a connection with the first computing device.

13. The method of claim 1, wherein the local device connection information comprises IP address information.

14. The method of claim 1,
wherein the local device connection information comprises connection information regarding whether the first computing device is currently connected to the connection server instance.

15. The method of claim 1, further comprising:
propagating the local device connection information received from the connection server instance to other region server instances of the plurality of region server instances.

16. The method of claim 1, further comprising:
during a subsequent defined interval, re-assigning the first computing device to a different region associated with the region server;
transmitting, to the messaging server instance and the connection server instance, a replica of an updated device-to-region mapping detailing the re-assignment of the first computing device to the different region;
responsive to transmitting the replica of the updated device-to-region mapping to the connection server instance, receiving, from the connection server instance, updated local device connection information created by the connection server instance detailing the connection between the first computing device and the connection server instance; and
utilizing the updated local device connection information received from the connection server instance to determine the connection the first computing device shares with the connection server instance thereby further preventing the blackout periods for propagating device connection information.

17. The non-transitory computer-readable medium of claim 5, wherein the instructions, when executed, further cause the region server to:
during a subsequent defined interval, re-assign the first computing device to a different region associated with the region server;
transmit, to the messaging server instance and the connection server instance, a replica of an updated device-to-region mapping detailing the re-assignment of the first computing device to the different region;
responsive to transmitting the replica of the updated device-to-region mapping to the connection server instance, receive, from the connection server instance, updated local device connection information created by the connection server instance detailing the connection between the first computing device and the connection server instance; and
utilize the updated local device connection information received from the connection server instance to determine the connection the first computing device shares with the connection server instance thereby further preventing the blackout periods for propagating device connection information.

18. The system of claim 9, further storing instructions that, when executed by one or more processors, further cause the system to:
during a subsequent defined interval, re-assign the first computing device to a different region associated with the system;
transmit, to the messaging server instance and the connection server instance, a replica of an updated device-to-region mapping detailing the re-assignment of the first computing device to the different region;
responsive to transmitting the replica of the updated device-to-region mapping to the connection server instance, receive, from the connection server instance, updated local device connection information created by the connection server instance detailing the connection between the first computing device and the connection server instance; and
utilize the updated local device connection information received from the connection server instance to determine the connection the first computing device shares with the connection server instance thereby further preventing the blackout periods for propagating device connection information.

\* \* \* \* \*